United States Patent
Defaisse

(10) Patent No.: US 9,259,863 B2
(45) Date of Patent: Feb. 16, 2016

(54) VULCANIZING DEVICE WITH RADIALLY MOBILE SEGMENTS FOR A TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Christian Defaisse, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 0 days.

(21) Appl. No.: 14/430,670

(22) PCT Filed: Sep. 18, 2013

(86) PCT No.: PCT/EP2013/069388
§ 371 (c)(1),
(2) Date: Mar. 24, 2015

(87) PCT Pub. No.: WO2014/044713
PCT Pub. Date: Mar. 27, 2014

(65) Prior Publication Data
US 2015/0251340 A1 Sep. 10, 2015

(30) Foreign Application Priority Data
Sep. 24, 2012 (FR) ................... 12 58943

(51) Int. Cl.
*B29D 30/06* (2006.01)
*B29C 35/00* (2006.01)
*B29L 30/00* (2006.01)

(52) U.S. Cl.
CPC .......... *B29C 35/002* (2013.01); *B29D 30/0629* (2013.01); *B29L 2030/00* (2013.01)

(58) Field of Classification Search
CPC ................. B29D 30/0605; B29D 30/0629
USPC ............................................. 425/46
See application file for complete search history.

(56) References Cited

U.S. PATENT DOCUMENTS 3,779,677 A * 12/1973 Greenwood ....... B29D 30/0629
425/32

(Continued)

FOREIGN PATENT DOCUMENTS

| EP | 0320588 A2 | 6/1989 |
|---|---|---|
| GB | 1409008 A | 10/1975 |
| WO | 2010019134 A1 | 2/2010 |

OTHER PUBLICATIONS

International Search Report for PCT/EP2013/069388 dated Nov. 19, 2013.

*Primary Examiner* — James Mackey
(74) *Attorney, Agent, or Firm* — Dickinson Wright PLLC

(57) ABSTRACT

Vulcanizing device with radially mobile segments comprising:
a bottom plate supporting a bottom shell for molding a tire sidewall,
an axially mobile top plate supporting a top shell for molding a tire sidewall,
an axially mobile closure ring comprising an inclined interior face,
a plurality of circumferentially arranged adjacent segments of which the interior radial faces comprise linings for molding the tread of the tire and of which the inclined exterior radial faces are able to collaborate with:
first means of coupling with the closure ring which are produced in such a way that the axial movements of the closure ring involve a radial movement of the segments, and
second means of coupling the segments to the top plate which are able to connect the segments to the top plate and to allow their radial movement,
the said second means of coupling being adjustable on the circumference of the top plate.

14 Claims, 5 Drawing Sheets

(56) References Cited

U.S. PATENT DOCUMENTS

| | | | |
|---|---|---|---|
| 3,787,155 A * | 1/1974 | Zangl | B29D 30/0629 425/46 |
| 3,990,823 A | 11/1976 | Le Moullac | |
| 4,580,959 A * | 4/1986 | Pizzorno | B29C 33/305 425/195 |
| 4,931,004 A | 6/1990 | Fogarasi et al. | |
| 7,354,261 B1 * | 4/2008 | Hineno | B29C 33/303 425/46 |
| 2011/0129559 A1 | 6/2011 | Makins | |

* cited by examiner

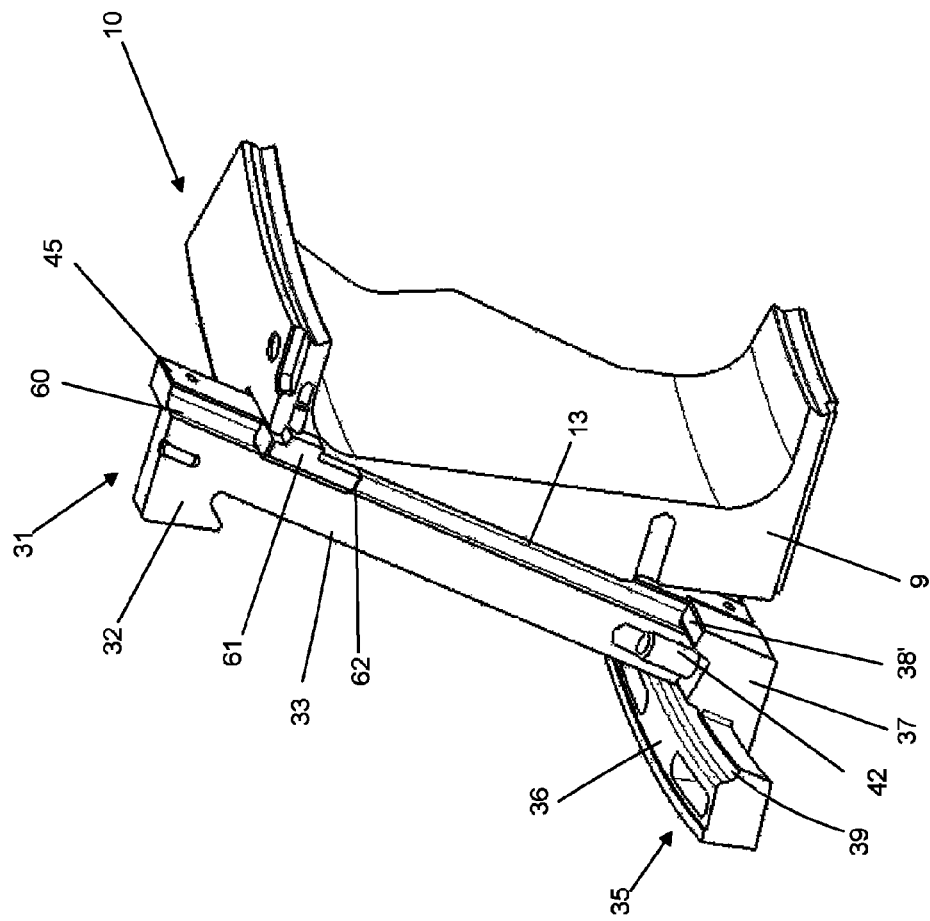
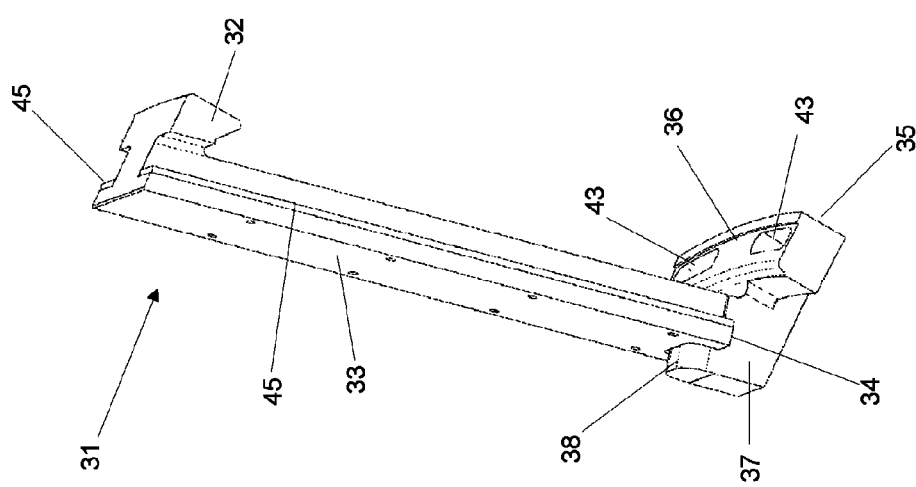

VULCANIZING DEVICE WITH RADIALLY MOBILE SEGMENTS FOR A TIRE

This application is a 371 national phase entry of PCT/EP2013/069388, filed 18 Sep. 2013, which claims benefit of French Patent Application No. 1258943, filed 24 Sep. 2012, which is incorporated herein by reference for all purposes.

BACKGROUND

1. Field

The present disclosure relates to a tire vulcanizing device, more specifically of the type in which the part intended to form the tread of the tire is divided into several segments that can be moved radially in relation to the axis of the mold. In this type of vulcanizing device, the space for molding the exterior surface of the tire is defined by two shells, each one molding one sidewall, and by a ring of segments which mold the tread, these components together forming a curing mold.

2. Description of Related Art

Vulcanizing devices vulcanize the tire by applying pressure and heat energy to a green form of tire. Vulcanizing devices of the segmented type are made as several components which are assembled and driven with suitable dynamics in relation to the curing press.

The methods used for radially closing the segments onto the green form of the tire often involve closing the segments by sliding along the internal surface of a conical closure ring. Of the vulcanizing devices that employ such a conical closure ring those comprising molds referred to as container molds, in which the bottom shell is fixed and the molding cavity is closed by first of all bringing the top shell that molds the sidewall into contact with the green tire, this movement being initiated by the top plate of the container, then bringing the segments into contact with the green tire, are preferred for reasons of ease of access to the molding space when loading and unloading the tire. At the time of opening the mold, the segments accompany the top shell as the latter is lifted.

A container-type curing mold of this kind is described in U.S. Pat. No. 3,779,677. The mold comprises two lateral shells used for molding a sidewall of the tire and a peripheral ring comprising elements for molding the tread, this ring being divided into several segments having lateral faces perpendicular to the axis of the mold and radial transverse faces. The mold is closed by bringing the lateral shells axially closer together and then by moving the segments radially towards the axis of the mold. The radial movement of the segments is performed by a conical closure ring set in motion by the top plate of the press. The closure ring on its radially internal face comprises several T-shaped components, each being made to slide in a channel having an inclined guide surface of corresponding shape made on the radially external surface of a mold segment. Pivoting coupling elements connect the mobile plate that supports the top shell to the segments allowing these to move axially with the plate and to slide radially in radial slots of the plate.

Another example of a segmented vulcanizing device operating on the same principle as that of the previous document is described in document EP-0 170 109, the conical closure plate comprising, on its radially internal surface, guide grooves in which correspondingly shaped coupling pieces borne by the segments of the mold slide. Prismatic coupling elements connect the top faces of the segments to the mobile plate allowing the segments to move axially with the plate and to slide radially in correspondingly shaped prismatic guides belonging to the plate.

The major disadvantage with these vulcanizing devices is that the segments actuating assembly is dedicated to a specific mold, the parts of the device being machined to suit a fixed number of segments each having a predetermined angle and an amplitude of edge cutout which is dictated by the pattern and the circumference of the tire that is to be vulcanized. More particularly, the closure rings of the prior art are equipped with slide ways fixed to the radially internal wall of the ring to collaborate with a given number of mold segments and a pre-established angular positioning thereof. What is more, the mobile upper plate is machined to form the guide parts for returning the segments, these parts being dictated by the number and position of the mold segments. Thus, the closure ring and top plate of the prior art are permanently set up and suited to just one vulcanizing mold. This makes manufacture of the ring and of the plate of the vulcanizing device expensive while at the same time restricting their use to a restricted number of tire types.

Also known is document WO 2010/019134 in the name of the applicant company which proposes a vulcanizing device comprising elements for the attachment of the several adjacent half-segments, the attachment elements being produced in such a way as to be fitted to the periphery of each closure half-ring. However, this solution is specific to a vulcanizing device the closing and opening system of which involves the use of thrusting springs that push each half-segment. That document cannot provide a solution for optimizing the structure of molds of the container type in which each segment needs to be connected to the mobile plate and guided in its radial movement with respect thereto and at the same time able to collaborate with a closure ring.

SUMMARY

The objective of embodiments of the invention is to at least partially overcome these disadvantages and to propose a vulcanizing device with radially mobile segments for a tire that can be used with molds of the container type having a variable number of segments.

This objective is achieved by an embodiment of the invention which proposes a vulcanizing device with radially mobile segments for molding and vulcanizing a tire comprising: a bottom plate supporting a bottom shell for molding a tire sidewall, an axially mobile top plate supporting a top shell for molding a tire sidewall, an axially mobile closure ring comprising an inclined interior face, a plurality of circumferentially arranged adjacent segments of which the interior radial faces comprise linings for molding the tread of the tire and of which the inclined exterior radial faces are able to collaborate with: first means of coupling with the closure ring which are produced in such a way that the axial movements of the closure ring involve a radial movement of the segments, and second means of coupling the said segments to the top plate which are able to connect the segments to the top plate and to allow their radial movement, the said second means of coupling being adjustable on the circumference of the top plate.

A closure ring means a ring that closes and closely hoops the mold segments, the ring comprising an inclined interior face collaborating with the inclined corresponding part of each segment. A mold means all of the parts intended to come into direct contact with the tire and which form a molding cavity for molding the latter. When the vulcanizing device is mounted in the press, the bottom plate of the device is secured to the fixed bottom platen of the press and the top plate is secured to the top platen of the press and able to move along the axis of the mold. In the vulcanizing device of the invention, the ring is secured to a mechanism which makes it move along the axis of the device and this ring can be raised and lowered independently of the top shell. The radially interior face of the closure ring is generally a frustoconical face. The radially exterior face of the segments which collaborates with the closure ring is also frustoconical and corresponds to the interior face of the ring, the inclination with respect to the axis of the mold providing the dynamic movement of the segments. The device of the invention comprises first means of coupling between the segments and the closure ring, these means of coupling allowing radial movement of the segments towards the outside and towards the inside of the device during the axial movement of the closure ring. Such means of coupling may be guide rods sliding in grooves of, for example, dovetail cross section.

According to an embodiment of the invention, the device comprises second means of coupling between the segments and the top plate, which are able to connect the segments to the top plate and allow them to move radially, the said second means of coupling being adjustable on the circumference of the top plate. Thus, the mobile top plate of the device comprises a radially exterior edge by means of which collaborating with means of attachment of the segments directly or through the intermediary of connecting pieces, this being so for a variable number of segments and different angular positions thereof. A radially outer edge means a circular ring situated on the periphery of the plate at a height lower than that of the top surface of the mobile plate of the device. This ring is produced by peripheral circular machining of the plate and may be a flat surface, a rib or a groove extending from the periphery of the top face of the mobile plate.

That allows the second means of coupling to be fitted to the periphery of the mobile plate, their position being determined by the circumferential position of each segment. Thus, with one single plate and a variable number of coupling pieces the position of the coupling pieces can be adjusted circumferentially in order to allow a variable number of mold segments to collaborate with a single type of mobile top plate.

For preference, the said first means of coupling with the closure ring comprise a plurality of guide pieces produced adjustably on the circumference of the said ring, each guide piece coming to collaborate with a guide groove of a segment.

The vulcanizing device of an embodiment of the invention additionally comprises several guide pieces which are mobile and can be fitted to the circumference of the closure ring and are made to be fixed in a position determined by that of the groove of the mold segments with which each guide piece is made to collaborate. In this way, the position of a guide piece on the closure ring can easily be adjusted circumferentially and the number of guide pieces can be adapted to suit the number of mold segments. It is also possible, for the same diameter of mold, to create a variable number of segments, which can subtend different angles, with different amplitudes of cutout at their transverse faces and then more readily adapt the closure ring. In this way, a simplified closure ring is obtained which can easily be adapted to several type of tire. Moreover, the cross sections of the rods and grooves are the same, disregarding a sliding clearance formed between them making it possible to have a good area of contact of ring with segments, over the entire circumference thereof, thus ensuring good heat transfer between the closure ring and the segments of the device. In this way, using the device of the invention, the mobile plate and also the closure ring can be adapted to suit the angular position and number of molding segments.

In a first alternative form of embodiment of the invention, the said second means of coupling comprise a radially exterior rim of the said top plate against which rim a roller mounted with freedom to rotate about a horizontal axle of a segment comes to press. Thus, the segments are allowed to move radially as a result of the rotation of the roller (or of several rollers arranged on the same axle) along the radially exterior edge of the plate.

For preference, the said horizontal axle is supported by a cranked flange mounted on the top lateral face of a segment. This allows the roller to be kept easily at the level of the top plate.

In a second alternative form of the invention, the said attachment means each comprise a horizontal crosspiece mounted on the top lateral face of a segment, the said crosspiece being able to slide along the rails of a removable jaw collaborating with the said radially exterior rim of the top plate. This solution assumes an arrangement of several removable jaws which will be attached to the radially exterior rim of the plate according to the number and angular position of the segments of the device so as to allow the segments to move radially as the device is closed and opened.

For preference, the said jaw comprises a circular rail able to collaborate with a correspondingly shaped groove of the said radially exterior rim. This allows better orientation and attachment of the jaws on the plate.

Advantageously, the said guide pieces are fixed adjustably in a circumferential notch of the said closure ring.

Thus, a guide piece may comprise a catching part to be inserted in a correspondingly shaped circumferential notch of the closure ring, ensuring better attachment in a position determined by that of the groove of a segment of each guide piece.

For preference, the said guide piece comprises a guide rod having at least one guide surface able to slide in the said groove and a hook arranged at one of the ends of the said rod to collaborate with the said circumferential notch.

This means that the assembly of the device can be made easier as the guide rod can be inserted easily between the ring and the segments until it catches on the lip of the notch of the ring. The notch and the projecting part have complementary profiles, for example of conical shape, to allow correct orientation of the guide pieces and make them easier to attach.

Advantageously, the other end of the said guide rod collaborates with means of attachment to a circular lip of the said closure ring. This allows the guide rod to be attached easily to the ring, for example using fixing screws on the lip opposite that of the notch of the ring.

For preference, the said means of attachment comprise a spacer piece comprising a circumferential part for attachment to the said ring and a radial part for attachment to the said rod. This allows the guide rod to be immobilized in terms of rotation on the circumference of the closure ring.

Advantageously, the circumferential part of the said spacer piece comprises a notch which collaborates with a complementarily-shaped circumferential rib belonging to the said closure ring. The rib preferably has a profile of conical shape, which allows the guide piece to be clamped against the closure ring with any clearance taken up.

For preference, the said radial part of the said spacer piece comprises a thrust surface for driving a segment. The segment-driving thrust surface may be a protrusion collaborating with the bottom of a groove of the segment or, conversely, a plane wall which contains a groove made in the guide piece to collaborate with a protuberance of a segment.

Advantageously, the said guide groove is positioned substantially in a circumferential part of the segment corresponding to the projection thereonto of the co-ordinates of the centre of gravity of a segment. It will be understood that the centre of the groove is positioned in the circumferential part of the radially exterior surface of a segment corresponding to the projection onto this face of the centre of gravity of the segment, this allowing forces acting on the segment to be positioned on the axis of the groove thereby balancing the dynamics of the whole.

For preference the said guide surface of the guide rods comprises plates that have a low co-efficient of friction. This improves the sliding of the guide pieces and ensures that the segments are driven smoothly.

BRIEF DESCRIPTION OF DRAWINGS

The embodiments of the invention will be better understood by virtue of the remainder of the description, which relies upon the following figures:

FIG. 4 is a perspective view of a guide piece and of its means of attachment to the closure ring of an embodiment of the invention;

FIG. 5 illustrates, by a simplified view in section, the engagement of a guide piece of the invention in the guide groove of a segment according to another embodiment of the invention;

DETAILED DESCRIPTION OF SPECIFIC EMBODIMENTS

In the various figures, elements that are identical or similar bear the same reference. A description thereof is not systematically repeated.

Figure 1:
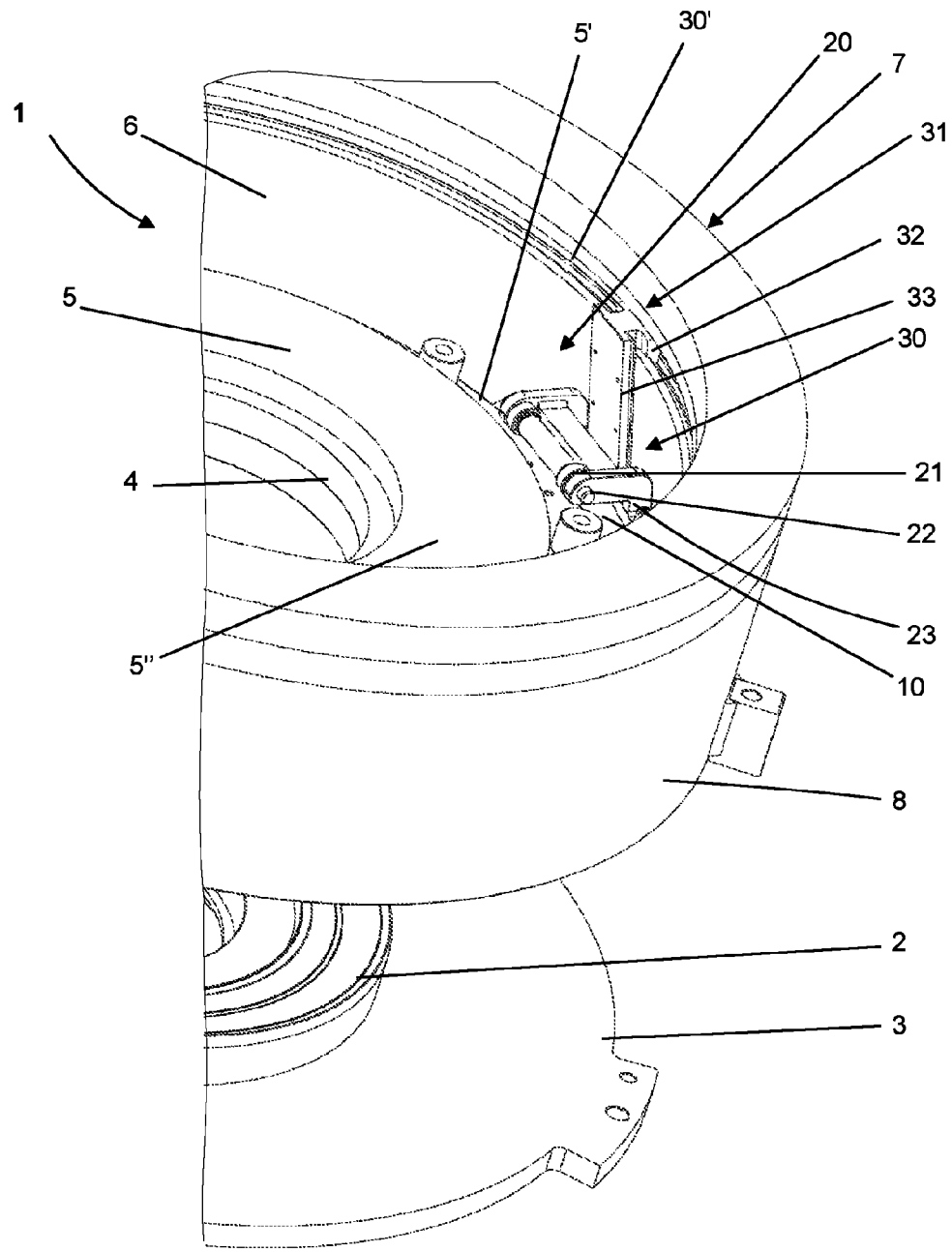
FIG. 1 is a simplified perspective view of a tire vulcanizing device according to a first alternative embodiment of the invention, the device being illustrated in the open position.

FIG. 1 illustrates a tire vulcanizing device 1 with radially mobile segments according to the invention which is able to collaborate with a vulcanizing press. The device 1 comprises a bottom shell 2 secured to a bottom plate 3 by means of which the device is mounted on the vulcanizing press. The bottom plate 3 supports the bottom shell 2, centres the device with respect to the vulcanizing press and transmits heat energy to the bottom shell 2. The device also comprises a top shell 4 secured to a top plate 5. The top plate 5 is mobile being secured to the double-acting cylinder of the press. Its purpose is to drive the segments of the device to open and to close. The top plate 5 supplies heat energy to the top shell 4 when it is in contact with the heating top platen of the press. The device also comprises a closure ring 7 which is a heating ring having a conical interior surface 6 (making for example an angle of 15° with the vertical) and a cylindrical exterior surface 8. Heating means (for example a duct for the circulation of steam or electric heating elements) are arranged inside the closure ring 7 and supply heat energy to the segments of the device so as to allow the tread to be vulcanized. The closure ring 7 is secured to a mechanism which provides the axial movement thereof, along the axis X-X' (FIG. 6) of the device, and may be rendered axially mobile independently of the top plate 5. The device 1 comprises a plurality of circumferentially arranged adjacent segments 10 (just one being illustrated in FIG. 1) each collaborating with the top plate 5 and the closure ring 7. The radially interior part of the segments 10 form the part that molds the tread of the tire. The number of segments 10 is determined according to the circumference and tread pattern of the tire; there may, for example, be from seven to twelve of these for a passenger car tire and from eleven to twenty-four for a heavy vehicle tire. The segments with which a mold is equipped may have identical or different sizes in order to adapt to suit the desired characteristics of the tire tread.

Figure 2:
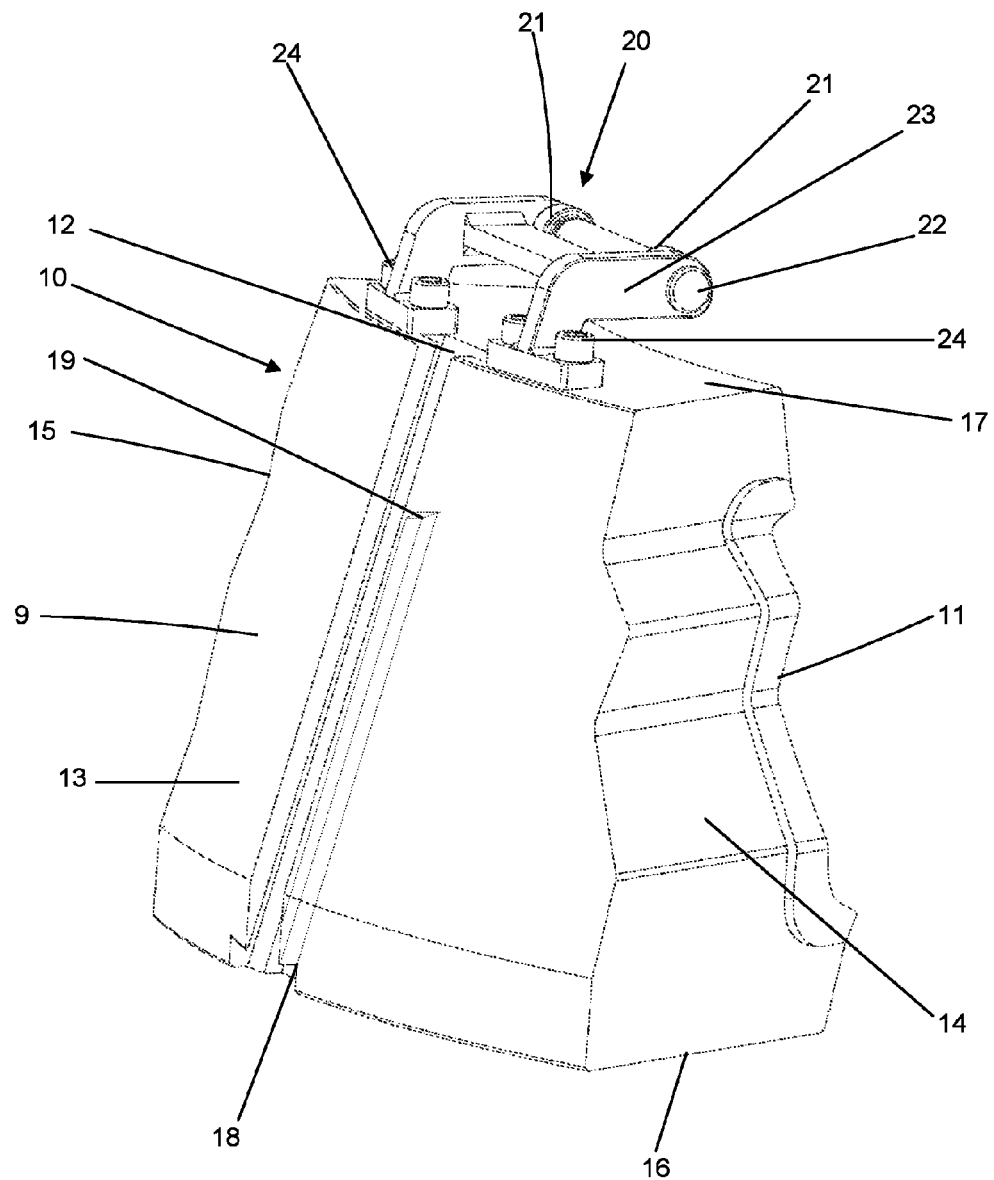
FIG. 2 is a perspective view of a segment with which the device of FIG. 1 is equipped.

As is best visible in FIG. 2, a segment 10 comprises a body 9 which on its radially interior face accepts a lining 11 which is a molding element for molding the crown of the tire, and on its exterior radial face 13 has a substantially vertically directed guide groove 12 parallel to the exterior radial surface 13 (for example making an angle of 15° with the vertical) and intended to collaborate with a complementary guide piece belonging to the closure ring 7 forming the first means 30 of coupling of the device, as will be explained later on. In the example depicted in the drawings, the guide groove 12 has a T-shaped cross section. A longitudinal groove 18 is made parallel to the guide groove 12, this is open at one of its ends at the bottom lateral face 16 of the segment and at its opposite end comprises a transverse wall 19 which serves to limit the travel of a segment 10 by collaborating with a corresponding part of a guide piece.

The lining 11 is generally made of aluminium by an injection molding technique and the body 9 is preferably produced by machining from a cast iron ring. The lining 11 (made as a single piece or as several independent elements) is fixed to the body 9 by rods and fixing screws (not depicted). Other ways of embodying the lining 1 and of assembling it with the body 9 of the segment may be envisaged, it being possible for example for the lining to be made as one piece (for example by injection molding) with this body. The transverse faces 14, 15 of the segment 10 are cut to a given profile and produced in such a way that two adjacent segments 10 can nest together when the mold is in the closed position. The guide groove 12 is made on the radially exterior surface of a segment 10 and its centre is situated in a circumferential part corresponding more or less to the projection of the centre of gravity of a segment 10 onto the exterior radial face thereof, with a tolerance of 1°, so that forces acting on the segment at the moment of the closing and opening of the mold are balanced. The bottom lateral face 16 is the face via which the segment 10 presses against the bottom plate 3 and the top lateral face 17 accepts means 20 of attachment to the top plate 5 of the device.

According to an embodiment of the invention, the top plate 5 of the vulcanizing device 1 is adapted to suit the number and angular position of the segments 10 so that it can be used with various configurations of mold, notably by using second means 20 of coupling between the top plate 5 of the device and the segments 10 which are adjustable on the circumference of the top plate 5. According to one advantageous aspect of the invention, the closure ring 7 of the device is also adapted to suit the number and angular position of the segments 10, notably by using first means of coupling between the segments 10 and the closure ring 7 which are adjustable on the circumference of the closure ring 7. That means that the closure ring 7 and the top plate 5 can be standardized and then used with different molds.

Figure 3:
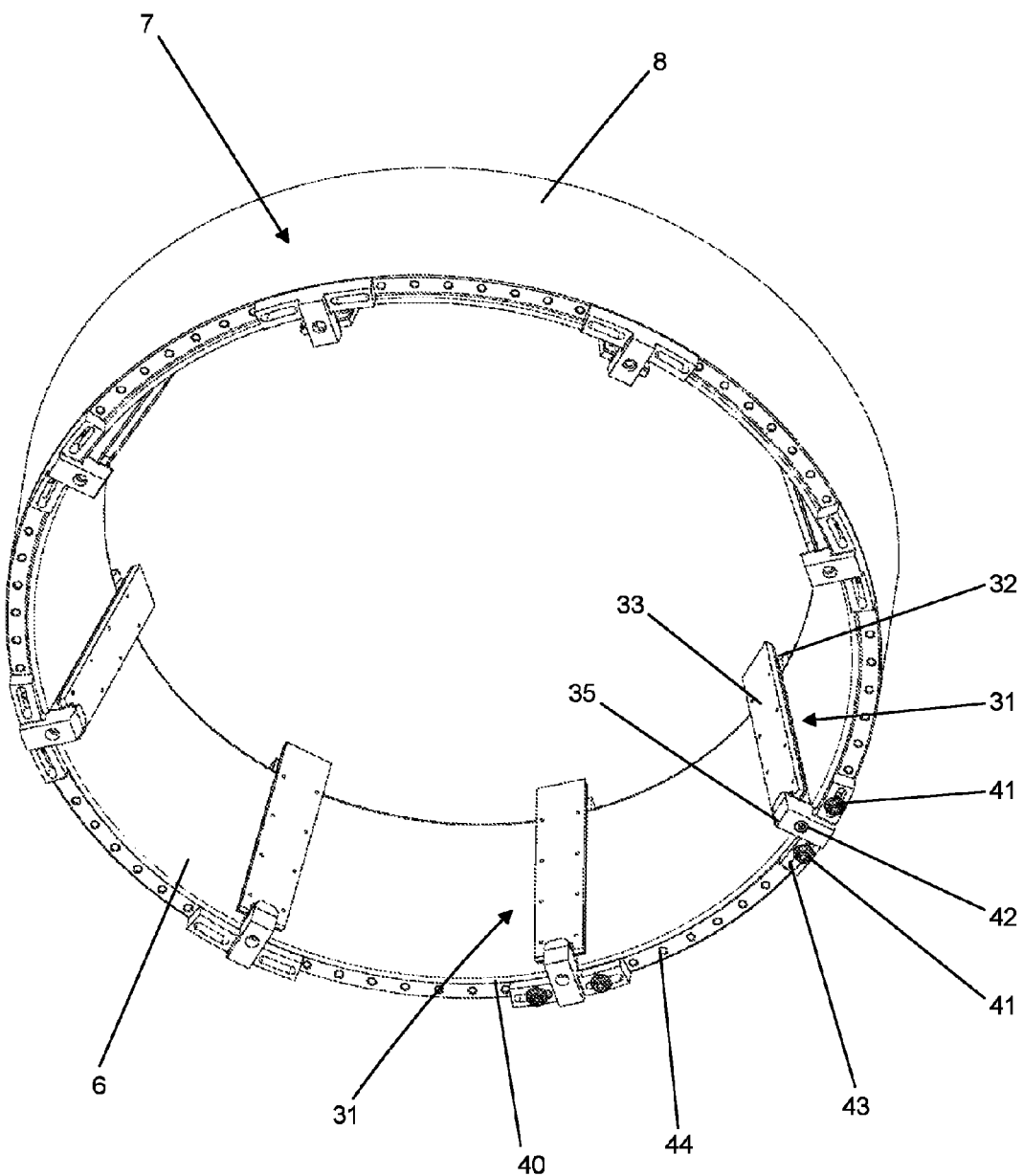
FIG. 3 is a perspective view of an assembly forming a closure ring according to an embodiment of the invention.

A closure ring 7 of the invention is best visible in FIGS. 1 and 3. The closure ring 7 is an annular component comprising a circumferential notch 30' in which the catching parts of the guide pieces 31 can slide. In the example depicted in the figures, a guide piece 31 is a component mounted removably with respect to the closure ring 7; it comprises a guide rod 33 ending at its top end in a hook 32. The hook 32 is preferably V-shaped and the circumferential notch 30' has a profile of complementary shape. The bottom end 34 of the guide piece 31 collaborates with a spacer piece 35 allowing it to be attached in the bottom part of the closure ring 7. The guide rod 33 comprises plates 45 with a low co-efficient of friction which are mounted on the guide surfaces that come into contact with the complementary surfaces of the guide groove 12. The guide rods 33 of the closure ring 7 and the guide grooves 12 of the segments 10 form the first means 30 of coupling.

According to one advantageous aspect of the invention, the closure ring 7 is made from nitrided steel and closes around segments 10 which are themselves made of cast iron. It has thus been found during the tests carried out that, for a good surface finish, the two components had good properties of sliding and, for this reason, the practice, generally employed in the prior art, of covering the interior surface of the closure ring 7 with plates of low co-efficient of friction has been abandoned. That makes it possible to avoid having to resort to additional interfaces and to obtain good thermal contact between the closure ring 7 and the segments 10.

As is best visible in FIG. 4, the spacer piece 35 comprises a circumferential part 36 for attachment to the lip of the closure ring 7 and a radial part 37 for immobilizing a guide piece 31.

The circumferential part 36 comprises a circumferential channel 39 having a cross section of the same shape as that of the bottom lip 40 (of FIG. 3), preferably a V-shape, of the closure ring 7. Two oblong slots 43 allow the spacer piece 35 to be attached using the screws 41 in orifices 44 made uniformly on the bottom lip of the closure ring 7. The attachment of the guide pieces 31 to the closure ring 7 at the top (in the circumferential notch 30') and bottom (in the bottom lip 40) thereof is on a dovetail contact profile allowing clamping against a conical surface with assembly clearances taken up.

In the example illustrated in FIG. 4, the radial part 37 comprises a protuberance 38 able to collaborate with the groove 18 of a segment 10, the top part of the protuberance 38 coming into abutment against the transverse wall 19 of the segment 10 (FIG. 2) in order to limit the travel of the segments 10 at the top. A screw 42 attaches the guide piece 31 to the spacer piece 35.

In another exemplary embodiment visible in FIG. 5, the guide piece 31 comprises a longitudinal groove 60 collaborating with an insert 61 mounted on the exterior radial face 13 of a segment 10, for example using a fixing screw. The bottom part 62 of the insert 61 collaborates with a flat 38' of the radial part 37 to form a thrust surface for axially driving the segments 10. In this example, the position of the insert 61 can be adjusted in order to limit the opening travel of the segments 10.

The guide rod 33 has a T-shaped cross section and is able to collaborate with the guide groove 12 of the segment 10. Other shapes of cross section for the grooves 12 and the guide rods 33 can be envisaged, such as dovetail cross sections or other types of cross section comprising two surfaces for guiding a guide rod 33 in longitudinal translation in a guide groove 12 in a direction that is inclined with respect to the axis of the device while at the same time allowing the segments 10 to move radially inwards and outwards.

According to an embodiment of the invention, each segment 10 comprises second means 20 of coupling to the top plate 5 which are designed so that the segments 10 can collaborate with a radially exterior rim 5' of the top plate 5 so as to be able to follow the axial movement thereof and so as to be able to move radially with respect to the top plate 5.

In a first alternative form of embodiment of the invention best visible in FIGS. 1 and 3, the second means 20 of coupling comprise two rollers 21 mounted with the freedom to rotate about a horizontal axle 22 supported by a cranked flange 23 which is itself fixed, by means of the screws 24, to the top lateral face 17 of the segment 10. The rollers 21 are able to come to press against the radially exterior rim 5' of the top plate 5 and, by rolling, allow the segments 10 to move radially as the device of the invention is opened and closed. The radially exterior rim 5' is a horizontal peripheral ring produced below the top surface 5" via which the force of the press is transmitted to the top plate 5. The top plate 5 has the shape of a two-tier circular podium.

Figure 6:
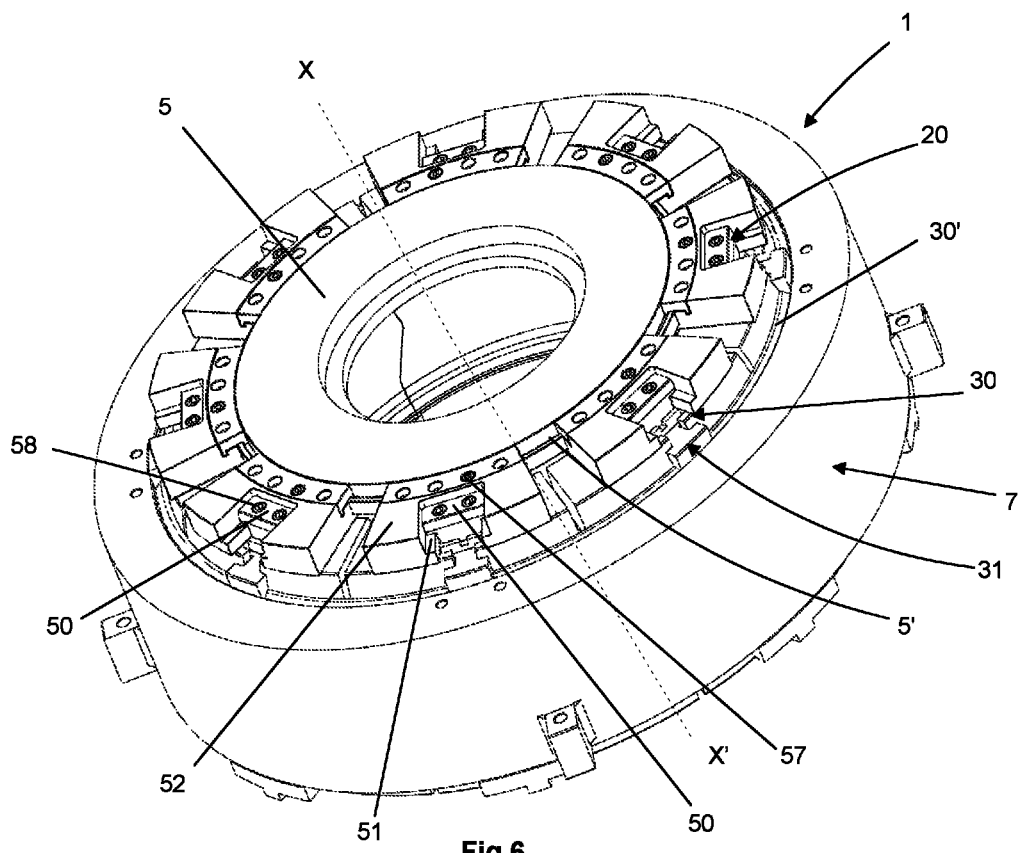
FIG. 6 is a perspective view of a tire vulcanizing device according to a second alternative form of the invention, the device being illustrated in the closed position.
Figure 7:
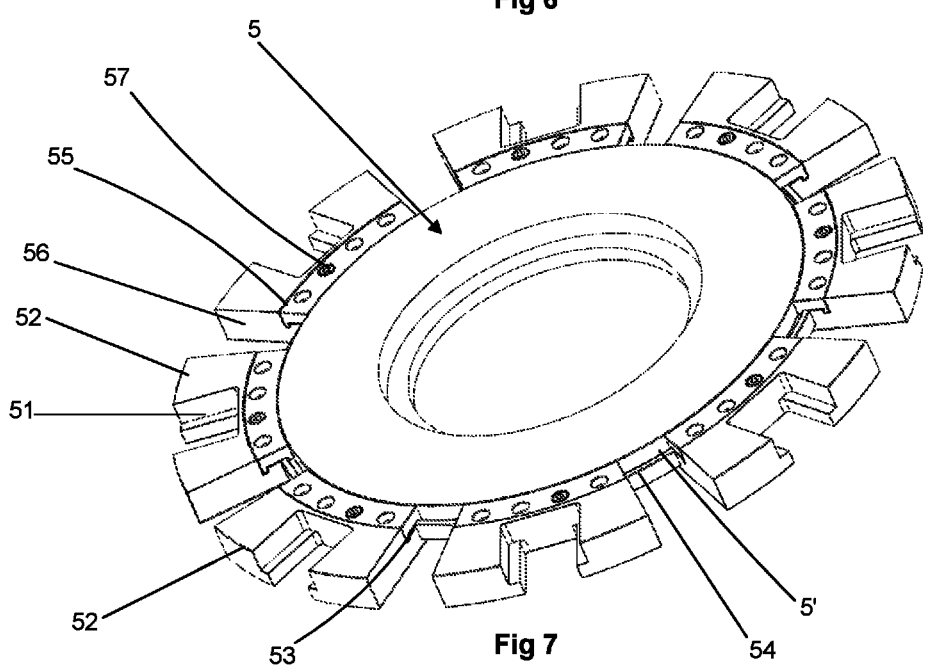
FIG. 7 is a perspective view of a top plate with which the device of FIG. 6 is equipped.

In a second alternative form of embodiment of the invention, as best visible in FIGS. 6 and 7, the second means 20 of coupling comprise a horizontal crosspiece 50 which slides on the longitudinal rails 51 of a jaw 52 fixed removably to the plate 5. The surface of contact of the rails 51 with the crosspiece 50 is provided with plates that have a low co-efficient of friction. The horizontal crosspiece 50 is fixed by means of the screws 58 to the top lateral part 17 of a segment 10. The jaw 52 comprises a circular rail 53 able to collaborate with a circular rib 54 of the radially exterior rim 5' of the plate 5. The jaw 52 is produced in two parts, a top part 55 and a bottom part 56, which sandwich the circular rib 54 of the plate 5 when they are attached to the top plate 5 using the screws 57. When the device of the invention is being assembled, a number of removable jaws 52 which is identical to the number of segments 10 that the device comprises are arranged radially at the periphery of the top plate 5, the position of each segment 10 determining where these jaws are fixed on the circumference of the plate 5.

Assembling a vulcanizing device of an embodiment of the invention begins with selecting the number of segments 10 needed to create a tire of given size and given tread pattern, and arranging them in a ring around the bottom shell 2. The closure ring 7 is then placed around the segments and the guide rods 33 are inserted in the guide grooves 12 of the segments 10 with their hook 42 pressing in the circumferential groove 30' of the closure ring 7. Each guide rod 33 is then fixed in position on the circumference of the closure ring 7 by tightening the screws 41, 42 of the spacer piece 35 onto the bottom lip 40 of the closure ring 7. The first means 30 of coupling are thus in place and the second means 20 of coupling are then mounted.

The mounting of the second means 20 of coupling which are produced according to the first alternative form of embodiment of the invention (FIG. 1) is performed by assembling the top plate 5 and the top shell 4 and attaching this to the assembly described previously. The screws 24 are then used to attach the cranked flanges 23 bearing the rollers 21, after the rollers 21 have been positioned beforehand on the radially exterior rim 5' of the top plate 5.

The second means 20 of coupling produced according to the second alternative form of embodiment (FIGS. 6 and 7) are mounted by first of all placing the bottom parts 56 of the jaws 52 around the top parts of the guide rods 33 already in position. A crosspiece 50 is also attached, using the screws 58, to the top lateral part 17 of each segment 10. The top plate 5 and the top shell 4 are assembled and these are then attached to the assembly previously described. The top part 55 of the jaw 52 is then attached to the bottom part 56 by fixing using the screws 57.

The vulcanizing device 1 thus assembled is then mounted on a curing press. When a green form of a tire is to be vulcanized, to start off with the device is opened by axially actuating the top plate 5 and the closure ring 7. The segments 10 thus find themselves in a closed position in the top part of the press and the device can be fed with a green tire which is placed in the molding cavity on the bottom shell 2. The top plate 5 is actuated in a downwards axial movement and it drives the segments 10 which are lowered with the plate while at the same time parting radially into the open position (by virtue of the combined action of the second means 20 of coupling and of the first means 30 of coupling). The segments 10 in their turn drive the closure ring 7, from the moment at which the guide grooves 12 come into abutment against the guide rods 33. The top plate 5 continues its downward travel until it comes into contact with the green tire. The closure ring 7 is then actuated in a downwards axial movement and the action of the first means 30 of coupling causes the segments 10 to close around the crown of the green form of the tire. The closure ring 7 holds the segments 10 in the closed position and contains the pressure during the vulcanizing of the tire. After curing, the vulcanizing device 1 is actuated to open by first of all moving the closure ring 7 in an upwards axial movement in order to open the segments 10. When the guide rods 33 of the closure ring 7 come into abutment (via their protuberance 38 against the thrust surface 19 in FIG. 4 or via the flat 38' against the bottom part 62 of the insert 61 in FIG. 5) in the guide grooves 12 of the segments 10, the latter accompany the ring in its upward movement. An upwards axial movement is then imparted to the top plate 5 which returns the segments 10 to the closed position in the top part of the press. The molding cavity is thus completely clear so that the tire can be taken away easily.

Other alternative forms and embodiments of the invention may be envisaged without departing from the scope of these claims.

The invention claimed is:

1. A vulcanizing device with radially mobile segments for molding and vulcanizing a tire comprising:
    a bottom plate supporting a bottom shell for molding a tire sidewall,
    an axially mobile top plate supporting a top shell for molding a tire sidewall,
    an axially mobile closure ring comprising an inclined interior face,
    a plurality of circumferentially arranged adjacent segments of which the interior radial faces comprise linings for molding the tread of the tire and of which the inclined exterior radial faces are able to collaborate with:
    first means of coupling with the closure ring which are produced in such a way that the axial movements of the closure ring involve a radial movement of the segments, and
    second means of coupling the segments to the top plate which are able to connect the segments to the top plate and to allow their radial movement,
    the second means of coupling being adjustable on the circumference of the top plate.

2. The device according to claim 1, wherein the first means of coupling with the closure ring comprise a plurality of guide pieces produced adjustably on the circumference of the said ring, each guide piece coming to collaborate with a guide groove of a segment.

3. The device according to claim 1, wherein the second means of coupling comprise a radially exterior rim of the said top plate against which rim a roller mounted with freedom to rotate about a horizontal axle of a segment comes to press.

4. The device according to claim 3, wherein the horizontal axle is supported by a cranked flange mounted on the top lateral face of a segment.

5. The device according to claim 1, wherein the second means of coupling comprise a removable jaw collaborating with a radially exterior rim of the top plate, the said jaw comprising guide rails for guiding the radial sliding of a horizontal crosspiece mounted on the top lateral face of a segment.

6. The device according to claim 5, wherein the jaw comprises a circular rail able to collaborate with a correspondingly shaped circular rib of the said radially exterior rim.

7. The device according to claim 2, wherein the guide pieces are fixed adjustably in a circumferential notch of the said closure ring.

8. The device according to claim 7, wherein the guide piece comprises a guide rod having at least one guide surface able to slide in the groove and a hook arranged at one of the ends of the said rod to collaborate with the said circumferential notch.

9. The device according to claim 8, wherein the other end of the guide rod collaborates with means of attachment to a circular lip of the said closure ring.

10. The device according to claim 9, wherein the means of attachment comprise a spacer piece comprising a circumferential part for attachment to the said ring and a radial part for attachment to the said guide rod.

11. The device according to claim 10, wherein the circumferential part of the said spacer piece comprises a notch which collaborates with a complementary-shaped circumferential rib belonging to the said closure ring.

12. The device according to claim 10, wherein the radial part of the said spacer piece comprises a protrusion or a flat for axial driving of a segment.

13. The device according to claim 2, wherein the guide groove is positioned substantially in a circumferential part of the centre of gravity of a segment.

14. The device according to claim 8, wherein the guide surface of the guide rods comprises plates that have a low co-efficient of friction.

* * * * *